United States Patent
Chen et al.

(10) Patent No.: US 9,655,086 B2
(45) Date of Patent: May 16, 2017

(54) ENHANCED PHYSICAL DOWNLINK CONTROL CHANNEL (EPDCCH) WITH PHYSICAL RESOURCE BLOCK (PRB) BUNDLING

(75) Inventors: Xiaogang Chen, Beijing (CN); Yuan Zhu, Beijing (CN); Qinghua Li, San Ramon, CA (US)

(73) Assignee: INTEL CORPORATION, Santa Clara, CA (US)

(*) Notice: Subject to any disclaimer, the term of this patent is extended or adjusted under 35 U.S.C. 154(b) by 776 days.

(21) Appl. No.: 13/591,865

(22) Filed: Aug. 22, 2012

(65) Prior Publication Data
US 2013/0242886 A1 Sep. 19, 2013

Related U.S. Application Data

(60) Provisional application No. 61/612,188, filed on Mar. 16, 2012.

(51) Int. Cl.
*H04W 4/00* (2009.01)
*H04W 72/04* (2009.01)
(Continued)

(52) U.S. Cl.
CPC ....... *H04W 72/0413* (2013.01); *H04L 1/0033* (2013.01); *H04L 1/1635* (2013.01); *H04L 1/189* (2013.01); *H04L 1/1825* (2013.01); *H04L 1/1854* (2013.01); *H04L 1/1864* (2013.01); *H04L 1/1877* (2013.01); *H04L 1/1887* (2013.01); *H04L 1/1896* (2013.01); *H04L 5/001* (2013.01); *H04L 5/0053* (2013.01); *H04L 5/0055* (2013.01); *H04L 5/0073* (2013.01); *H04L 5/14* (2013.01); *H04L 5/1438* (2013.01);
(Continued)

(58) Field of Classification Search
CPC ... H04W 72/02; H04W 72/04; H04W 72/044; H04W 72/0446; H04W 72/048; H04W 72/12; H04W 72/1278
USPC ........................................................ 370/329
See application file for complete search history.

(56) References Cited

U.S. PATENT DOCUMENTS

2010/0195600 A1 8/2010 Gorokhov et al.
2011/0310831 A1 12/2011 Bhattad et al.
(Continued)

FOREIGN PATENT DOCUMENTS

CN 102158884 A 8/2011
CN 102170703 A 8/2011
(Continued)

OTHER PUBLICATIONS

"3GPP TSG-RAN WG#68, R1-120076, Title: On reference signal design for enhanced control channels, Feb. 6-10, 2012".*
(Continued)

*Primary Examiner* — Chi H Pham
*Assistant Examiner* — Abdeltif Ajid
(74) *Attorney, Agent, or Firm* — Thorpe North & Western

(57) ABSTRACT

Technology for physical resource block (PRB) bundling an enhanced physical downlink control channel (ePDCCH) with a physical downlink shared channel (PDSCH) is disclosed. One method can include a wireless device receiving from a node the ePDCCH in an ePDCCH PRB contiguous in frequency with a PDSCH PRB carrying the PDSCH. The wireless device can PRB bundle the ePDCCH PRB with the PDSCH PRB.

22 Claims, 12 Drawing Sheets

(51) Int. Cl.

| | | |
|---|---|---|
| *H04W 24/02* | (2009.01) | |
| *H04N 21/414* | (2011.01) | |
| *H04N 21/6408* | (2011.01) | |
| *H04W 4/06* | (2009.01) | |
| *H04L 5/00* | (2006.01) | |
| *H04L 5/14* | (2006.01) | |
| *H04L 1/18* | (2006.01) | |
| *H04W 74/08* | (2009.01) | |
| *H04L 12/18* | (2006.01) | |
| *H04L 29/06* | (2006.01) | |
| *H04N 21/258* | (2011.01) | |
| *H04N 21/6405* | (2011.01) | |
| *H04W 24/00* | (2009.01) | |
| *H04W 28/02* | (2009.01) | |
| *H04W 72/08* | (2009.01) | |
| *H04W 76/04* | (2009.01) | |
| *H04L 1/00* | (2006.01) | |
| *H04L 1/16* | (2006.01) | |
| *H04L 12/28* | (2006.01) | |
| *H04W 52/24* | (2009.01) | |
| *H04W 52/02* | (2009.01) | |
| *H04W 52/14* | (2009.01) | |
| *H04W 72/12* | (2009.01) | |

(52) U.S. Cl.
CPC .......... *H04L 5/1469* (2013.01); *H04L 12/189* (2013.01); *H04L 12/2854* (2013.01); *H04L 65/601* (2013.01); *H04N 21/25841* (2013.01); *H04N 21/41407* (2013.01); *H04N 21/6405* (2013.01); *H04N 21/6408* (2013.01); *H04W 4/06* (2013.01); *H04W 24/00* (2013.01); *H04W 24/02* (2013.01); *H04W 28/0236* (2013.01); *H04W 28/0268* (2013.01); *H04W 28/0278* (2013.01); *H04W 52/02* (2013.01); *H04W 52/0206* (2013.01); *H04W 52/0209* (2013.01); *H04W 52/0235* (2013.01); *H04W 52/243* (2013.01); *H04W 72/04* (2013.01); *H04W 72/042* (2013.01); *H04W 72/0406* (2013.01); *H04W 72/048* (2013.01); *H04W 72/0426* (2013.01); *H04W 72/082* (2013.01); *H04W 72/1205* (2013.01); *H04W 72/1242* (2013.01); *H04W 72/1273* (2013.01); *H04W 72/1284* (2013.01); *H04W 74/085* (2013.01); *H04W 76/048* (2013.01); *H04L 1/1819* (2013.01); *H04W 52/0229* (2013.01); *H04W 52/143* (2013.01); *H04W 72/0446* (2013.01); *H04W 72/1268* (2013.01); *Y02B 60/50* (2013.01)

(56) References Cited

U.S. PATENT DOCUMENTS

| | | | | |
|---|---|---|---|---|
| 2013/0039291 | A1* | 2/2013 | Blankenship | H04L 5/001 370/329 |
| 2013/0044692 | A1* | 2/2013 | Nory | H04L 25/0228 370/329 |
| 2013/0129008 | A1* | 5/2013 | Ko | H04B 7/0473 375/295 |
| 2013/0188577 | A1* | 7/2013 | Papasakellariou | H04W 72/04 370/329 |
| 2014/0286240 | A1* | 9/2014 | Kim | H04W 56/0005 370/328 |
| 2014/0301346 | A1* | 10/2014 | Seo | H04L 5/0048 370/329 |
| 2014/0369287 | A1* | 12/2014 | Kim | H04L 25/0202 370/329 |

FOREIGN PATENT DOCUMENTS

| | | |
|---|---|---|
| CN | 102316581 A | 1/2012 |
| EP | 2383928 A2 | 11/2011 |
| WO | WO 2011/132988 A2 | 10/2011 |
| WO | 2013/138659 A1 | 9/2013 |

OTHER PUBLICATIONS

Ericsson, et al. "On reference signal design for enhanced control channels", 3GPP TSG-RAN WG1 #68, R1-120076, Dresden, Germany, Feb. 6-10, 2012, 5 Pages.

Intel Corporation, "Analysis of ePDCCH and POSCH Multiplexing", 3GPP TSG,RAN WG1 Meeting #68, R1-120609, Dresden, Germany, Feb. 6-10, 2012, 4 Pages.

International Search Report and Written Opinion received for PCT Application No. PCT/US2013/031690, mailed on Jun. 28, 2013, 13 Pages.

Motorola Mobility, "E-PDCCH Design Aspects", 3GPP TSG RAN WG1 R1-114029, Nov. 2011, 4 pages, Meeting 67, Agenda 7.7, San Francisco, USA.

QUALCOMM Europe, "UE-RS Patterns for Ranks 5 to 8 of LTE-A", 3GPP TSG-RAN WG1 R1-09212, Oct. 2009, 10 pages, Meeting 58bis, Agenda 7.3.1, Miyazaki, Japan.

Search Report for European application 13761149 dated Nov. 6, 2015, 9 pages.

Panasonic, "Multiplexing between ePDCCH and PDSCH", 3GPP TSG RAN WG1 R1-120235, Meeting 68, Agenda 7.6.2, Feb. 2012, Dresden, Germany, 3 pages.

* cited by examiner

ENHANCED PHYSICAL DOWNLINK CONTROL CHANNEL (EPDCCH) WITH PHYSICAL RESOURCE BLOCK (PRB) BUNDLING

RELATED APPLICATIONS

This application claims the benefit of and hereby incorporates by reference U.S. Provisional Patent Application Ser. No. 61/612,188, filed Mar. 16, 2012.

BACKGROUND

Wireless mobile communication technology uses various standards and protocols to transmit data between a node (e.g., a transmission station or a transceiver node) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) modulation for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (or eNodeB) to the wireless device (or UE), and the uplink (UL) transmission can be a communication from the wireless device to the node.

In LTE, data can be transmitted from the eNode B to the UE via a physical downlink shared channel (PDSCH). A physical downlink control channel (PDCCH) can be used to transfer downlink control information (DCI) that informs the UE about resource allocations or scheduling related to downlink resource assignments on the PDSCH, uplink resource grants, and uplink power control commands. The PDCCH can be transmitted prior the PDSCH in each subframe transmitted from the eNode B to the UE.

The PDCCH signal can be designed to be demodulated at the UE based on a cell specific reference signal (CRS). However, the use of a CRS does not take into account the increased complexities of advanced LTE systems. For instance, in heterogeneous networks, multiple nodes can simultaneously transmit within a single cell. The use of the cell specific reference signal can limit advanced techniques to increase cell capacity.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
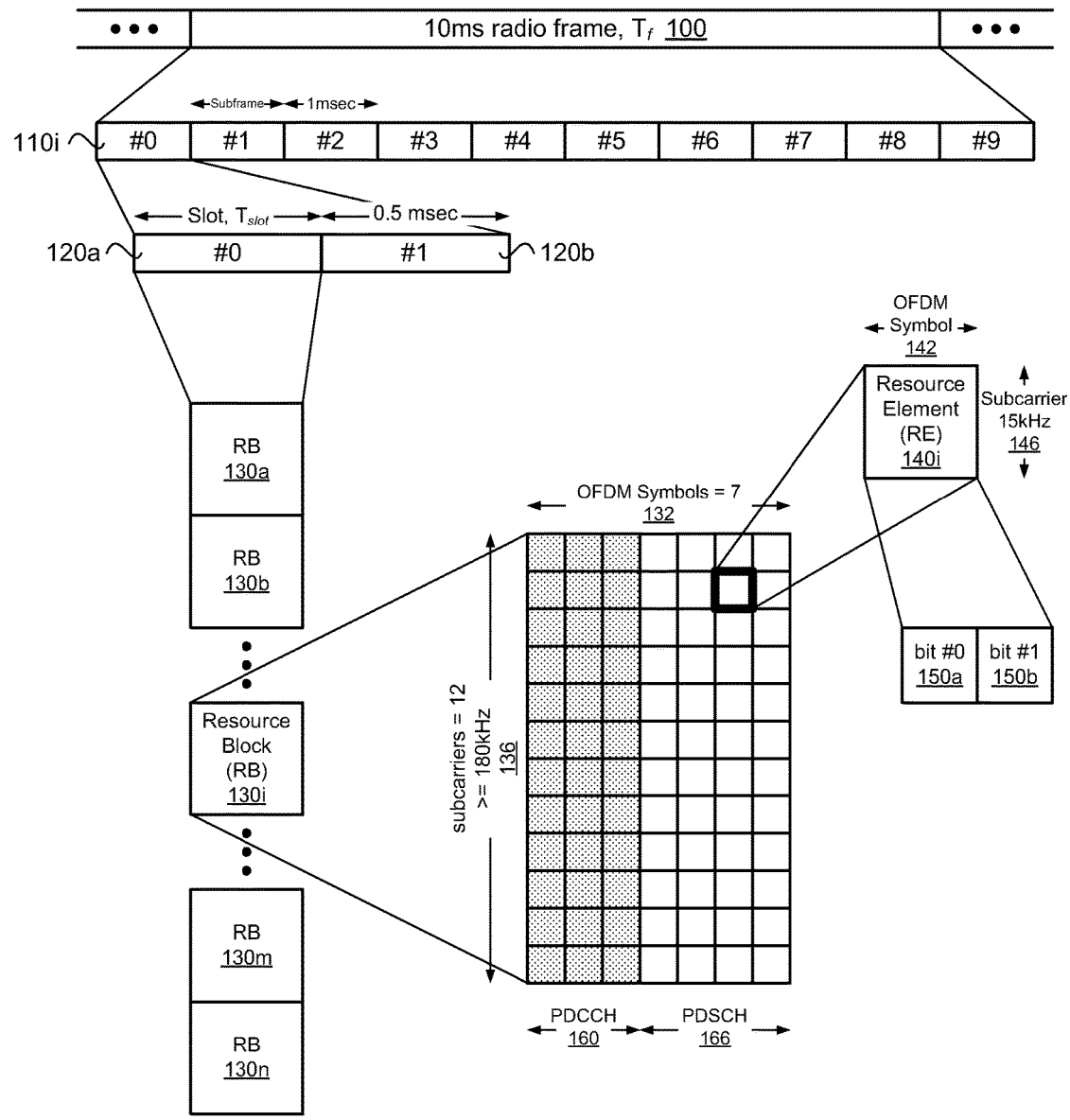
FIG. 1 illustrates a block diagram of radio frame resources (e.g., a resource grid) including a legacy physical downlink control channel (PDCCH) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The communication of data on the physical downlink shared channel (PDSCH) can be controlled via a control channel, referred to as a physical downlink control channel (PDCCH). The PDCCH can be used for downlink (DL) and uplink (UL) resource assignments, transmit power commands, and paging indicators. The PDSCH scheduling grant can be designated to a particular wireless device (e.g., UE) for dedicated PDSCH resource allocation to carry UE-specific traffic, or it can be designated to all wireless devices in the cell for common PDSCH resource allocation to carry broadcast control information such as system information or paging.

In one example, the PDCCH and PDSCH can represent elements of a radio frame structure transmitted on the physical (PHY) layer in a downlink transmission between a node (e.g., eNodeB) and the wireless device (e.g., UE) using a generic long term evolution (LTE) frame structure, as illustrated in FIG. 1.

FIG. 1 illustrates a downlink radio frame structure type 2. In the example, a radio frame 100 of a signal used to transmit the data can be configured to have a duration, $T_f$, of 10 milliseconds (ms). Each radio frame can be segmented or divided into ten subframes 110i that are each 1 ms long. Each subframe can be further subdivided into two slots 120a and 120b, each with a duration, $T_{slot}$, of 0.5 ms. The first slot (#0) 120a can include a legacy physical downlink control channel (PDCCH) 160 and/or a physical downlink shared channel (PDSCH) 166, and the second slot (#1) 120b can include data transmitted using the PDSCH. Each slot for a component carrier (CC) used by the node and the wireless device can include multiple resource blocks (RBs) 130a, 130b, 130i, 130m, and 130n based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first OFDM symbols in each subframe or RB, when a legacy PDCCH is used. The remaining 11 to 13 OFDM symbols (or 14 OFDM symbols, when legacy PDCCH is not used) in the subframe may be allocated to the PDSCH for data (for short or normal cyclic prefix). Each RB (physical RB or PRB) 130i can include 12-15 kHz subcarriers 136 (on the frequency axis) and 6 or 7 orthogonal frequency-division multiplexing (OFDM) symbols 132 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 140i using short or normal cyclic prefixing, or the resource block can be mapped to 72 REs (not shown) using extended cyclic prefixing. The RE can be a unit of one OFDM symbol 142 by one subcarrier (i.e., 15 kHz) 146. Each RE can transmit two bits 150a and 150b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Figure 2:
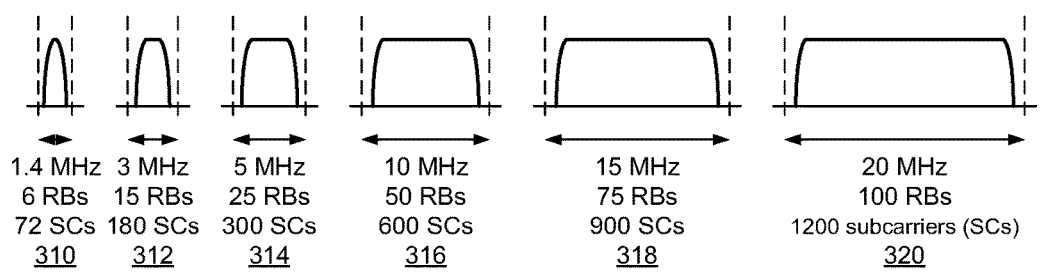
FIG. 2 illustrates a block diagram of various component carrier (CC) bandwidths in accordance with an example.

Each wireless device may use at least one signal bandwidth, carrier bandwidth, or component carrier (CC), as illustrated in FIG. 2. For example, the LTE CC bandwidths can include: 1.4 MHz 310, 3 MHz 312, 5 MHz 314, 10 MHz 316, 15 MHz 318, and 20 MHz 320. The 1.4 MHz CC can include 6 RBs comprising 72 subcarriers. The 3 MHz CC can include 15 RBs comprising 180 subcarriers. The 5 MHz CC can include 25 RBs comprising 300 subcarriers. The 10 MHz CC can include 50 RBs comprising 600 subcarriers. The 15 MHz CC can include 75 RBs comprising 900 subcarriers. The 20 MHz CC can include 100 RBs comprising 1200 subcarriers.

The data carried on the PDCCH can be referred to as downlink control information (DCI). Multiple wireless devices can be scheduled in one subframe of a radio frame. Therefore, multiple DCI messages can be sent using multiple PDCCHs. The DCI information in a PDCCH can be transmitted using one or more control channel elements (CCE). A CCE can be comprised of a group of resource element groups (REGs). A legacy CCE can include up to nine REGs. Each REG can be comprised of four resource elements (REs). Each resource element can include two bits of information when quadrature modulation is used. Therefore, a legacy CCE can include up to 72 bits of information. When more than 72 bits of information are needed to convey the DCI message, multiple CCEs can be employed. The use of multiple CCEs can be referred to as an aggregation level. In one example, the aggregation levels can be defined as 1, 2, 4 or 8 consecutive CCEs allocated to one PDCCH.

The legacy PDCCH can create limitations to advances made in other areas of wireless communication. For example, mapping of CCEs to subframes in OFDM symbols is typically spread over the control region to provide spatial diversity. However, no beam forming diversity may be possible with the current mapping procedures.

Moreover, the capacity of the legacy PDCCH may not be sufficient for advanced control signaling. For instance, networks may be configured as heterogeneous networks (HetNets) can include a number of different kinds of nodes in a single macro cell serving area. More wireless devices can be served simultaneously by macro and pico cells in the HetNet. The PDCCH can be designed to demodulate based on cell-specific reference signals (CRS), which can make fully exploring cell splitting gain difficult. The legacy PDCCH may not be adequate to convey the information needed to allow a wireless device to take advantage of the multiple transmission nodes in the HetNet to increase bandwidth and decrease battery usage at the wireless device.

In addition, the use of multi-user multiple-input multiple-output (MU-MIMO), machine to machine communication (M2M), PDSCH transmission in a multicast\broadcast single-frequency network, and cross carrier scheduling in carrier aggregation can require increased capacity for the PDCCH. The use of UE specific reference signals (UERS) in PDCCH demodulation at the wireless device can allow the use of multiple nodes in the HetNet. Rather than relying on a single common reference symbol (e.g., CRS) for an entire cell, each reference symbol can be UE specific (e.g., UERS).

To overcome the limitations of the legacy PDCCH, an enhanced PDCCH (ePDCCH) can use the REs in an entire PRB or PRB pair (where a PRB pair is two continuous PRBs using the same subcarriers in a subframe), instead of just the first one to three columns of OFDM symbols in a first slot PRB in a subframe as in the legacy PDCCH. Accordingly, the ePDCCH can be configured with increased capacity to allow advances in the design of cellular networks and to minimize currently known challenges.

Figure 3:
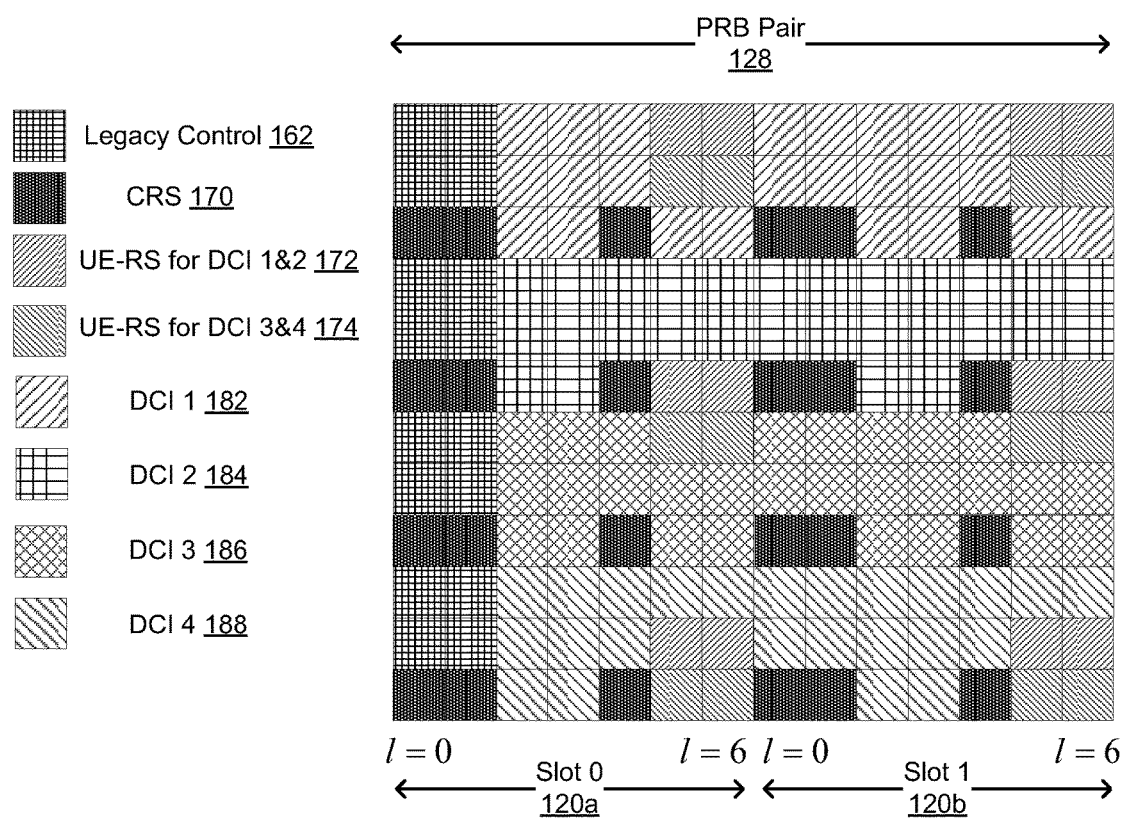
FIG. 3 illustrates a block diagram of multiplexing four localized aggregation level one control channel elements (CCE) associated with downlink control information (DCI) into one physical resource block (PRB) pair in accordance with an example.

Unlike the legacy PDCCH, the ePDCCH can be mapped to the same REs or region in a PRB as the PDSCH, but in different PRBs. In an example, the PDSCH and the ePDCCH may not be multiplexed within a same PRB (or a same PRB pair). Thus if one PRB (or one PRB pair) contains an ePDCCH, the unused REs in the PRB (or PRB pair) may be blanked, since the REs may not be used for the PDSCH. FIG. 3 illustrates 4 DCIs 182, 184, 186, and 188 of an ePDCCH in a PRB pair 128. Each DCI of the ePDCCH can be transmitted by at least one CCE, and each CCE can include a plurality of REGs, and each REG can include a plurality of REs. FIG. 3 illustrates a multiplexing pattern of an ePDCCH when multiple aggregation level (AGL) one localized CCEs are multiplexed in one PRB pair. An aggregation level one CCE (e.g., a single CCE) can include a DCI, so four CCEs can include four separate DCIs. In another example (not shown), an aggregation level two CCE (e.g., two CCEs) can include one DCI. The PRB pair can also include legacy control 162 (e.g., legacy PDCCH) and reference signals, such as cell-specific reference signals (CRS) 170 and UE specific reference signals (UERS) 172 and 174, used for demodulation and channel estimation. In an example, DCI 1 and DCI 2 can use UERS 172 different from the UERS 174 used by DCI 3 and DCI 4.

Figure 4:
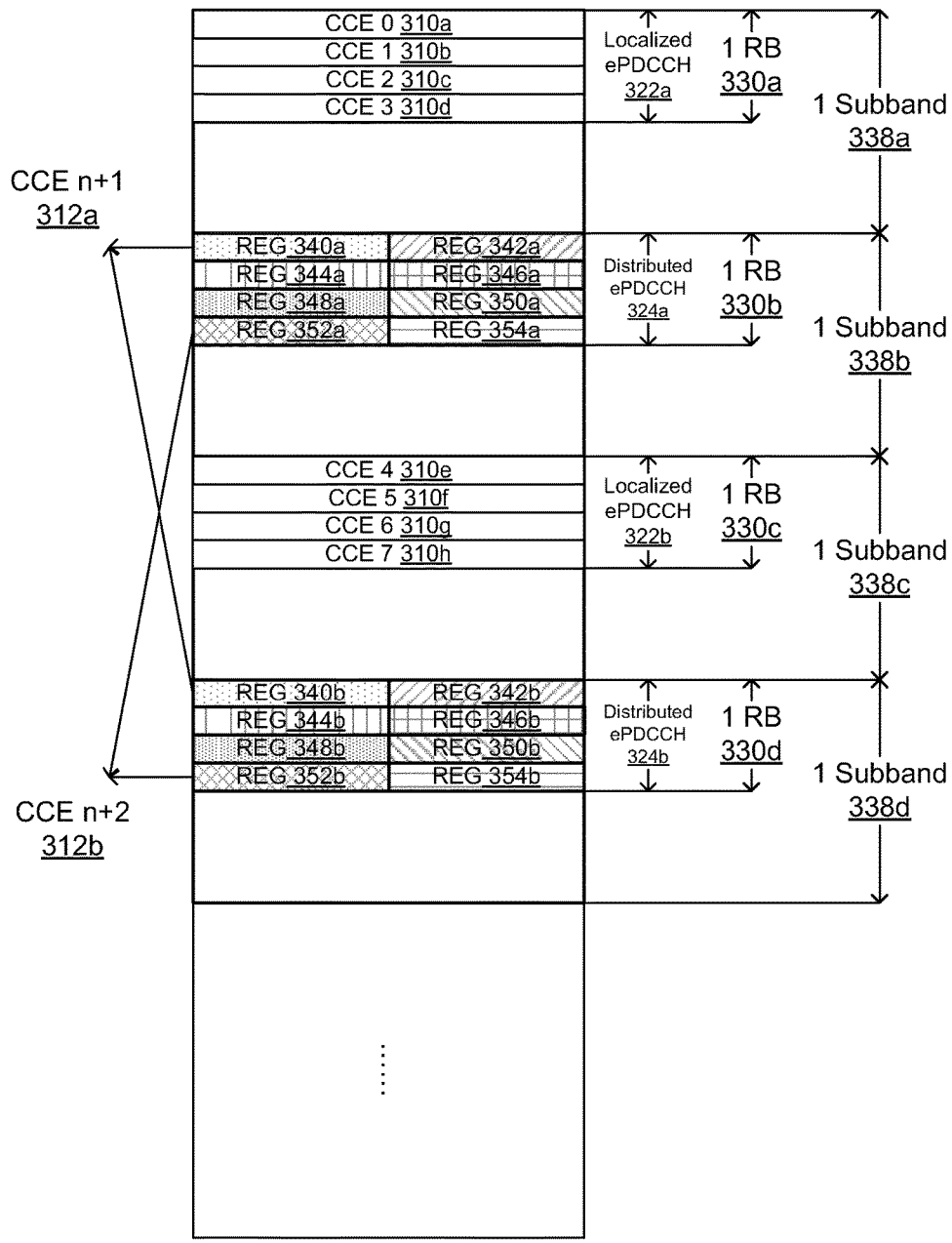
FIG. 4 illustrates a block diagram of control channel elements (CCE) and resource element groups (REG) mapped to a subframe using localized enhanced physical downlink control channels (ePDCCH) and distributed ePDCCH in accordance with an example.
Figure 5:
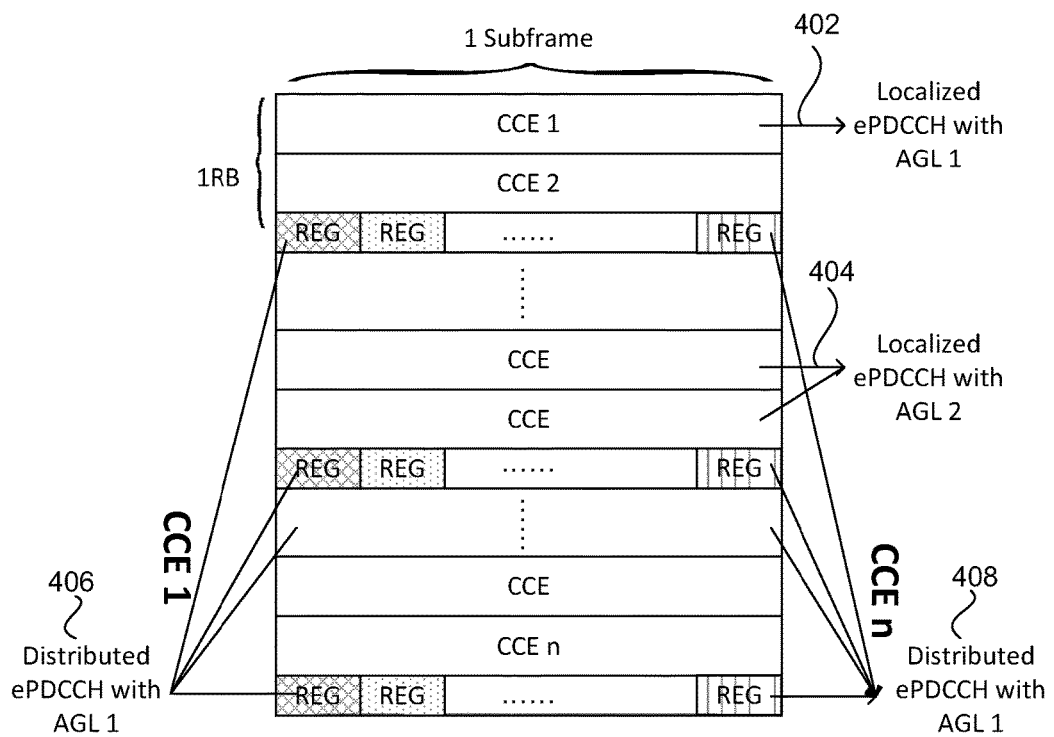
FIG. 5 illustrates a block diagram of an enhanced physical downlink control channel (ePDCCH) mapped to a subframe using localized ePDCCH and distributed ePDCCH in accordance with an example.

The PRB or PRB pair can be used to support both localized ePDCCH and distributed ePDCCH transmissions. FIGS. 4 and 5 illustrate localized ePDCCH and distributed ePDCCH in a slot or a subframe. In a localized ePDCCH 332a-b, the entire CCE 310a-h may be within a PRB 330a and 330c (or PRB pair) within a subband 338a and 338c, as illustrated in FIG. 4. In an example, the REGs (or REs) of the localized CCE can be contiguous to each other, which may be followed by a subsequent CCE. In a distributed ePDCCH 324a-b, the REGs 340a-b, 342a-b, 344a-b, 346a-b, 348a-b, 350a-b, 352a-b, and 354a-b of the CCE 312a-b can be distributed over multiple PRBs 330b and 330d (or PRB pairs). The REG(s) 340a in one PRB 330b and the REG(s) 340b in another PRB 330d can form the CCE 312a for the DCI or the distributed ePDCCH. In distributed ePDCCH, the REGs for a CCE can be distributed over two or more PRBs (or two or more PRB pairs). In an example, the REGs of the CCEs used in the distributed ePDCCH can be distributed over different subbands 338b and 338d.

FIG. 5 provides another example of a localized ePDCCH and a distributed ePDCCH mapped into CCEs, REGs, and REs within a subframe. In the example of FIG. 5, each resource block pair can comprise two resource blocks (RB or PRB), each having the same subcarriers, located in a first and second slot in the subframe of a radio frame, as shown in FIG. 1. Each RB can include at least one CCE. The CCE may be in a defined location within the RB. However, the CCE may include REGs that are located throughout the resource block. Each REG may include four REs. However, based on system requirements, a REG may include more or less REs. In an example, the REs located in a REG can be contiguous in at least one of frequency and time. In another example, the REs located in a REG may be separated in time and/or frequency. The number of REGs in a CCE may be a fixed number, such as nine. Alternatively, the number of REGs may vary based on DCI data load requirements (i.e., the amount of DCI data), or other competing requirements in the RB, such as physical control format indicator channel (PCFICH) requirements, physical hybrid-ARQ indicator channel (PHICH) requirements, and resource symbol requirements for data allocated within each resource block. The CCE may be mapped across a slot boundary in the physical resource block pair.

A localized ePDCCH 402 having aggregation level (AGL) one can be mapped to a single CCE, which can be mapped to a single RB, as shown in FIG. 5. Similarly, a localized ePDCCH 404 with an aggregation level of two may be mapped to two contiguous CCEs in a RB. For a distributed ePDCCH 406 and 408, the CCE(s) (e.g. CCE 1 and CCE N) can mapped to a plurality of REGs in different RBs in different frequency carriers and subcarriers. For example, the REGs for the CCE N can be distributed in frequency. The frequency separation of the REGs can provide a frequency diversity gain. In an example, each REG in a CCE may be mapped to a separate RB, although more than one REG may be mapped to a same RB as another REG. A greater frequency diversity gain that can occur with widely distributed the REGs. The REGs in CCE 1 and CCE N may have the same distribution (shown) or different distribution (not shown) amongst RBs in a subframe. While the REGs illustrated in the distributed ePDCCH 406 and 408 are each shown to be in the same time position within a RB, for each respective CCE, a same time position within a RB for the distributed ePDCCH is not required. The distributed REGs in CCE 1 and CCE N may be in a different temporal location within a resource block. Each CCE in a subframe may have a same number of REGs or a different number of REGs. The distributed ePDCCH can have an aggregation level of one. The aggregation level of one implies that the DCI information can be mapped to a single CCE.

The distribution of the REGs in a CCE over frequency to different resource blocks in a subframe can provide an increase in frequency diversity gain. FIG. 5 illustrates a distributed ePDCCH 406 and 408 transmission a high frequency diversity order and low aggregation level.

In another example, when the ePDCCH has an aggregation level greater than one (e.g., aggregation level 2, 4, or 8) the CCE can include localized CCE or distributed CCEs. A localized CCE can be CCEs (for an ePDCCH with an aggregation level greater than one) that are contiguous to each other, which may be followed by a subsequent CCE in time or frequency. A distributed CCE can be CCEs (for an ePDCCH with an aggregation level greater than one) that are non-contiguous or CCEs distributed over multiple PRBs (or PRB pairs).

In another example, PRBs used in a downlink channel or transmission can be precoded. A channel-dependent precoder can be used for communicating over a multiple-input multiple-output (MIMO) channel and/or signal allocation over multiple antennas. In an example, the precoder can provide for transmit beamforming and power allocation across the transmitted streams. In another example, the precoder values can be selected or assigned based on feedback.

In LTE, a wireless device (e.g., UE) configured for transmission mode 9 for a specified serving cell can have a precoding granularity with multiple resource blocks in the frequency domain (e.g., within a same subframe or a same slot) when feedback (e.g., spatial feedback) is configured. The feedback can include a precoding matrix indicator (PMI), a rank indicator (RI), or a channel quality indicator (CQI). Using multiple physical resource blocks within a same subframe or a same slot using for precoding, demodulation, and/or channel estimation can be referred to as physical resource block (PRB) bundling. The PMI or RI feedback can apply to the multiple resource blocks grouped in a precoding resource block group (PRG) or a resource block group (RBG). The PRBs within the PRG can use a same precoder. In an example, the precoder can be assigned by the node, and the PRB bundling can be applied by the wireless device. Without PRB bundling, channel estimation may use fewer reference signals in a single PRB, which can be less precise than a channel estimate using multiple PRBs precoded with a same precoder. PRB bundling can improve the performance through channel estimation gain.

Transmission mode 9 allows the transmission of PDSCH using user equipment-specific reference signals (UERSs or UE-RSs) or channel state information reference signals (CSI-RS) with up to eight spatial layers. Transmission mode 9 transmission can be used for PDSCH transmission for closed-loop single-user multiple-input multiple-output (SU-MIMO) or closed-loop multi-user MIMO operation (or spatial multiplexing) with up to 8 layers. Transmission mode 9 can support dynamic switching between SU-MIMO and MU-MIMO (using DCI format 2C).

The PRG size can vary based on the system bandwidth. The PRG size can be the number of PRBs within a PRB bundle or PRG. For a system bandwidth of less than 10 PRBs (e.g., 1.4 MHz) the PRG size P'can be one PRB per group. For a system bandwidth of 11-26 PRBs (e.g., 3 or 5 MHz) or 64-110 PRBs (e.g., 15 or 20 MHz) the PRG size P'can be two PRBs per group. For a system bandwidth of 27-63 PRBs (e.g., 10 MHz) the PRG size P'can be three PRBs per group.

In an example, the ePDCCH and the PDSCH can be frequency division multiplexed (FDM) at a PRB pair level. FIG. 3 illustrates different DCIs FDM in one PRB pair. In another example, the PDSCH and the ePDCCH may not be multiplexed within a same PRB (or a same PRB pair), but both the ePDCCH and the PDSCH may exist within a PRB bundling window. PRB bundling with the ePDCCH and the PDSCH can be performed in some cases, and the ePDCCH may be excluded from PRB bundling (including the PDSCH) in other scenarios for valid (or accurate) demodulation or channel estimation.

In a configuration, a node can indicate to a wireless device (e.g., UE) that has been configured to apply PRB bundling to exclude the PRB used by ePDCCH in a PRB bundling process. The indication can be provided through radio resource control (RRC) signaling. Excluding the PRB carrying the ePDCCH from the PRB bundle can provide a scarification (e.g., break up or reduction) of a PRB bundling gain.

Figure 6:
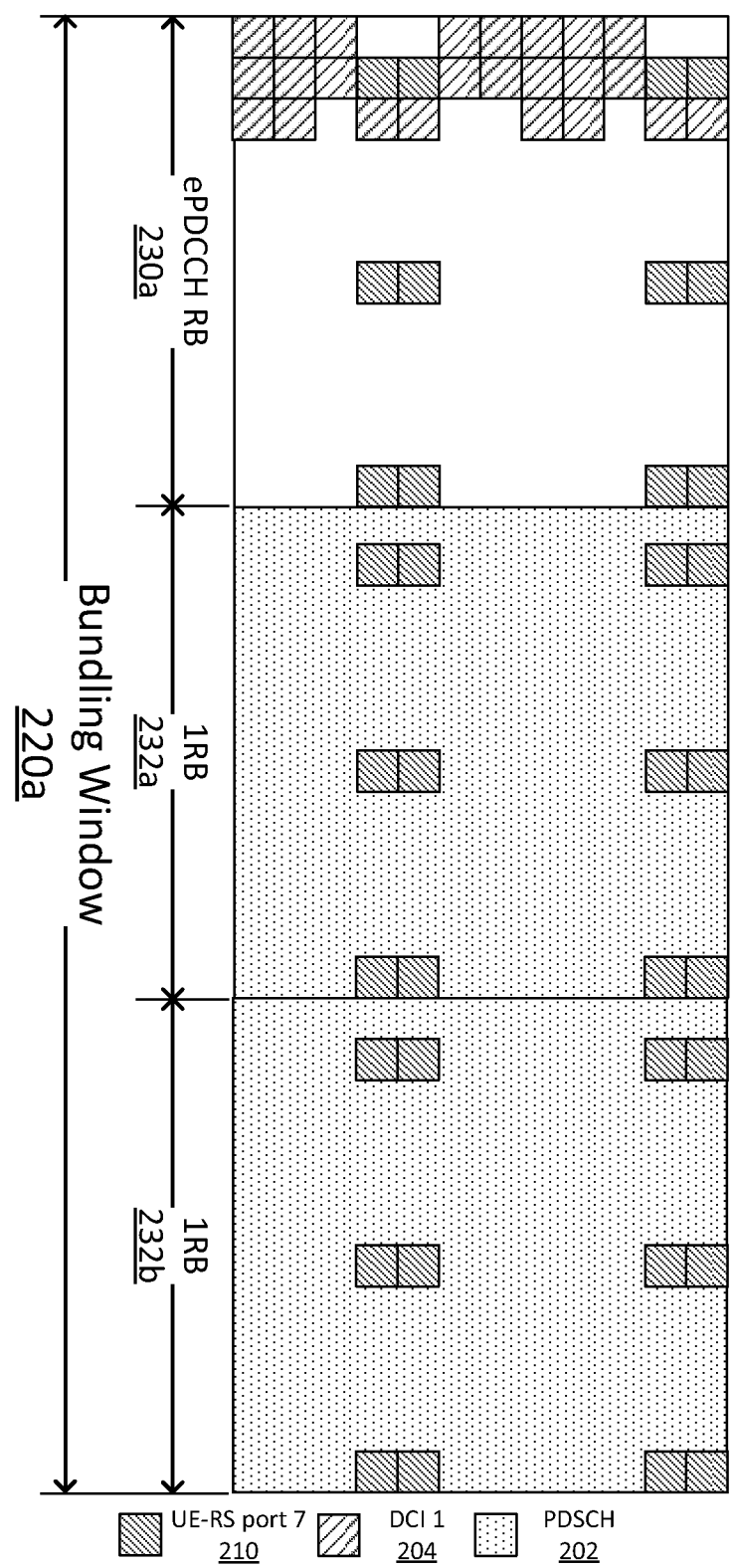
FIG. 6 illustrates a block diagram of physical resource block (PRB) bundling with a same user equipment-specific reference signal (UERS) port for a localized enhanced physical downlink control channel (ePDCCH) and a physical downlink shared channel (PDSCH) in accordance with an example.

In another configuration, the wireless device (e.g., UE) can PRB bundle the PRB used by ePDCCH and the PRB used by PDSCH for various localized ePDCCH transmissions and distributed ePDCCH transmissions. For example, if the wireless device detects that ePDCCH and PDSCH are transmitted with a same rank on a same antenna ports, the wireless device can apply PRB bundling of the ePDCCH and the PDSCH. The node (e.g., eNB) can indicate to the wireless device to apply PRB bundling. The indication to apply PRB bundling can be transmitted to the wireless device via radio resource control (RRC) signaling. The rank of the transmission can be the number of layers transmitted. A layer can be number of different data streams generated by spatial multiplexing, where each data stream can be transmitted on a transmit antenna of the node. The ePDCCH and the PDSCH can be demodulated and/or the channel can be estimated from a same UERS port. FIG. 6 illustrates a PRB bundling window 220a including an ePDCCH RB 220a carrying DCI 1 204 and PDSCH 202 RBs 232a-b where the UERS in ePDCCH RB and PDSCH RB use UE-RS port 7 210.

Figure 7:
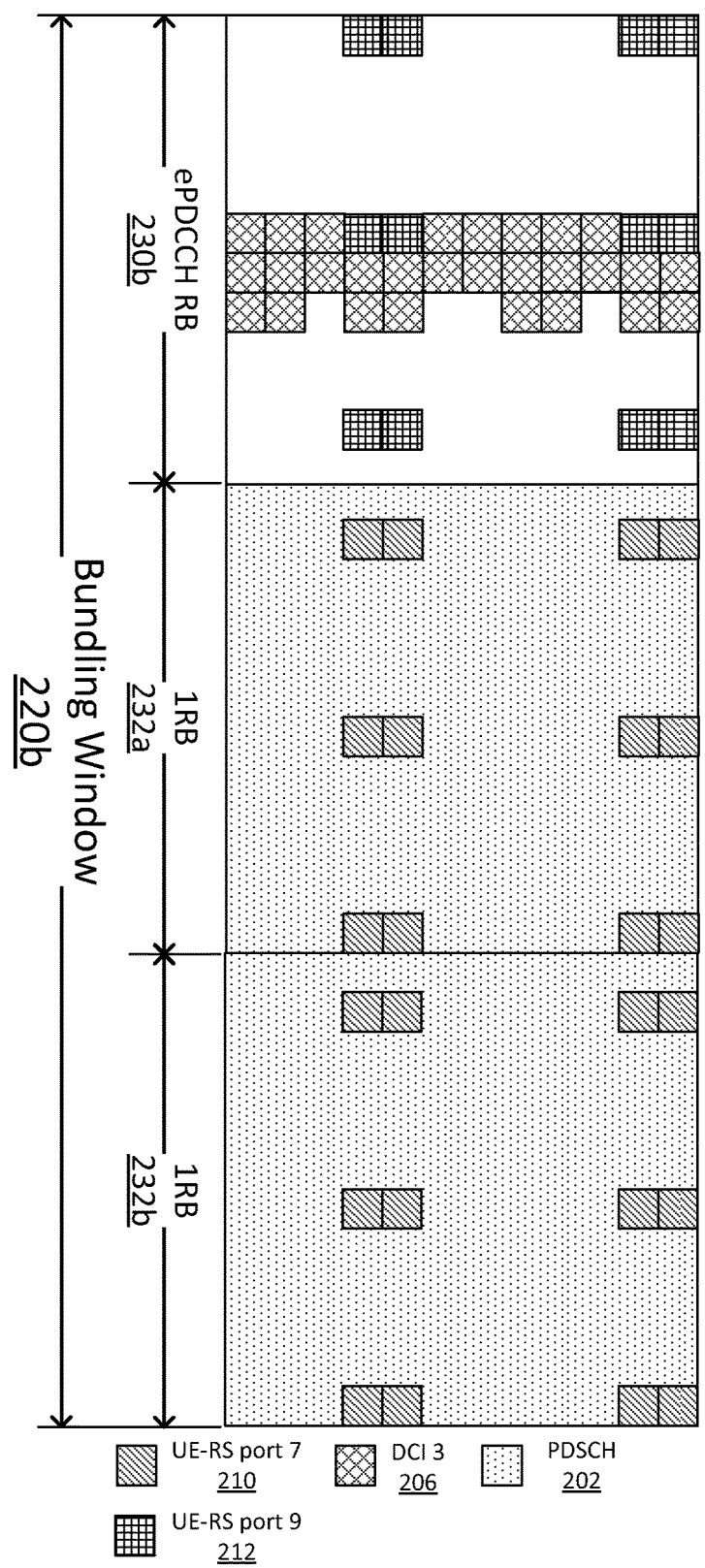
FIG. 7 illustrates a block diagram of physical resource block (PRB) bundling with different user equipment-specific reference signal (UERS) ports for a localized enhanced physical downlink control channel (ePDCCH) and a physical downlink shared channel (PDSCH) in accordance with an example.

In another example, the ePDCCH and the PDSCH can be demodulated and/or the channel can be estimated from different UERS ports. For example, the ePDCCH can be demodulated from UERS port 9, and the PDSCH can be demodulated from port 7. If the wireless device detects that ePDCCH and PDSCH are transmitted with a same rank on different antenna ports, the wireless device can apply PRB bundling. For example, FIG. 7 illustrates a PRB bundling window 220b including an ePDCCH RB 220b carrying DCI 3 206 and PDSCH 202 RBs 232a-b where the UERS in ePDCCH RB use UE-RS port 9 212 and the UERS in PDSCH RB use UE-RS port 7 210. For example, UERS port 9 in ePDCCH RB and UERS port 7 in PDSCH RB can be bundled for channel estimation or demodulation. Both the UERS ports in ePDCCH RB and the UERS ports in the PDSCH RB can be used for demodulation and channel estimation of the PRB bundle. Although UE-RS port 7 and 9 are illustrated, any UE-RS port (e.g., UE-RS port 7, 8, 9, or 10) may be used.

In another example, when an ePDCCH and PDSCH transmission use different ranks from each other, the wireless device can demodulate the DCI from the ePDCCH and demodulate PDSCH from different UERS ports. For example, an ePDCCH can be transmitted by rank 1 from the node and the wireless device can demodulate the DCI from UERS port 9, and the PDSCH can be transmitted with rank 2 from the node and the wireless device can demodulate PDSCH from UERS port 7 and 8.

Figure 8:
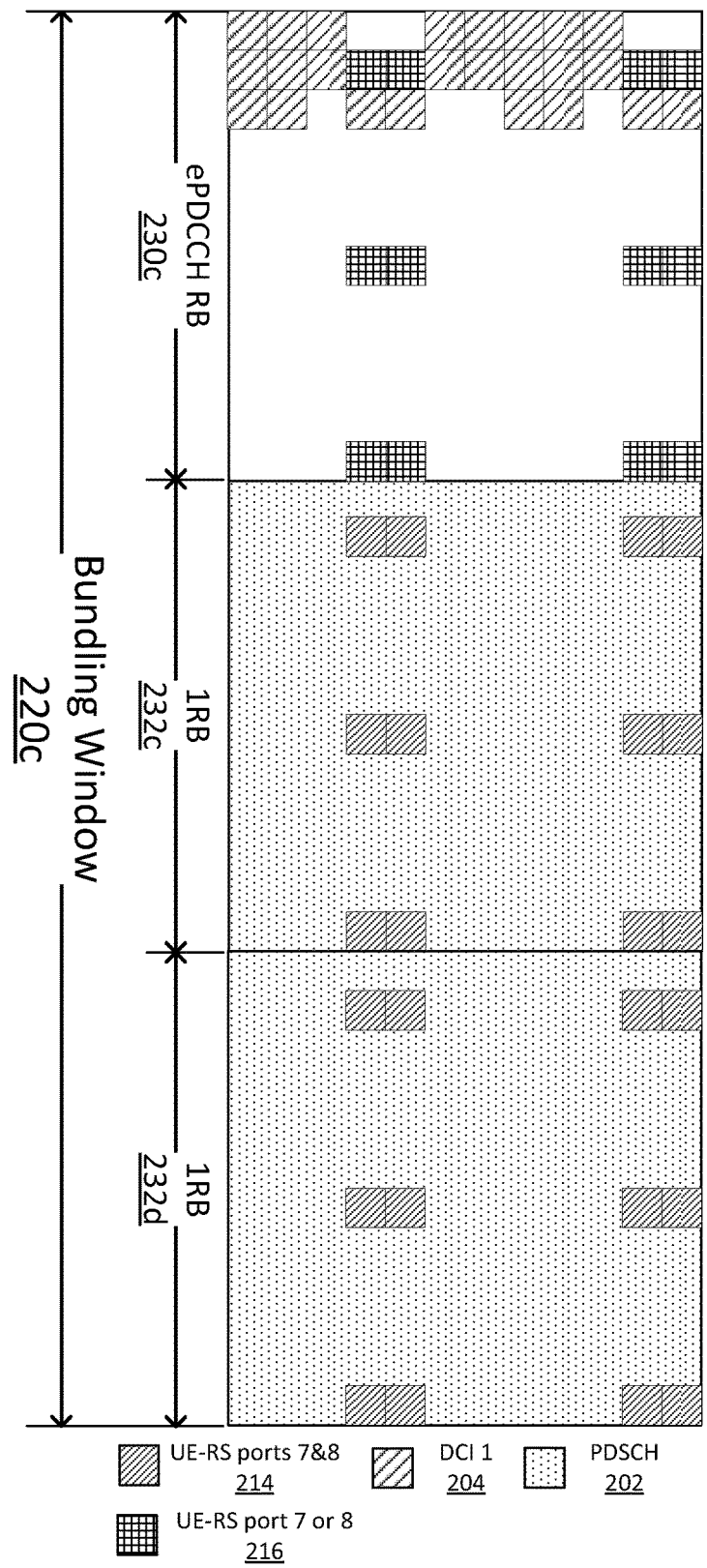
FIG. 8 illustrates a block diagram of physical resource block (PRB) bundling with different ranks for a localized enhanced physical downlink control channel (ePDCCH) and a physical downlink shared channel (PDSCH) in accordance with an example.

The wireless device can detect the rank of ePDCCH (from upper layer, such as RRC signaling) and the rank of PDSCH from DCI information. If the ePDCCH and the PDSCH are transmitted with a different rank, the wireless device can apply PRB bundling. FIG. 8 illustrates a PRB bundling window 220c including an ePDCCH RB 220c carrying DCI 1 204 and PDSCH 202 RBs 232c-d where the UERS in ePDCCH use UE-RS port 7 or 8 216 and the UERS in PDSCH use UE-RS ports 7 and 8 214. A lowest rank UERS port (either of the ePDCCH or the PDSCH) can be used for demodulation and channel estimation of the PRB bundle.

In another example, the node (e.g., eNB) can transmit to multiple wireless devices via a MU-MIMO mode which can be transparent to a wireless device (e.g., the spatial multiplexing capacity on the PDSCH can be unknown to the wireless device even after DCI decoding). With the MU-MIMO mode, a reference signal (RS) power imbalance can occur between the ePDCCH RB and the PDSCH RB even when the wireless device detects that both the ePDCCH and the PDSCH are transmitted with a same rank. In an example, when MU-MIMO is applied, the node can indicate to the wireless device to exclude the ePDCCH RB from PRB bundling. The indication to exclude the ePDCCH RB from PRB bundling can be transmitted to the wireless device via radio resource control (RRC) signaling. Alternatively, the node can de-boost the power of UERS in ePDCCH RB for MU-MIMO to keep a similar energy per resource element (EPRE) ratio between the UERS in ePDCCH RB and the UERS in PDSCH RB. The power of the UERS in ePDCCH RB can be de-boosted by a power offset $\delta_{power-offset}$.

Like MU-MIMO, random beamforming or closed loop beamforming can be transparent the wireless device. In an example, random or closed loop beamforming can be used for distributed ePDCCH transmission. The wireless device can apply PRB bundling to the ePDCCH RB and the PDSCH RB for random or closed loop beamforming when the node uses a same precoding vector for the ePDCCH RB as the PDSCH RB. When the node uses different precoding vectors between the ePDCCH RB and the PDSCH RB, the node can transmit an indication to the wireless device to exclude ePDCCH RB from the PRB bundling process, and the wireless device can exclude ePDCCH RB from the PRB bundle.

In another example, transmit diversity can be used for distributed ePDCCH transmission. The wireless device can apply PRB bundling to the ePDCCH transmitted with transmit diversity and the PDSCH transmitted with beamforming. The wireless device can apply PRB bundling to the ePDCCH RB and the PDSCH RB for transmit diversity and/or beamforming when the node uses a same precoding vector for the ePDCCH RB as the PDSCH RB. When the node uses different precoding vectors between the ePDCCH RB and the PDSCH RB, the node can transmit an indication to the wireless device to exclude ePDCCH RB from the PRB bundling process, and the wireless device can exclude ePDCCH RB from the PRB bundle.

Transmit diversity can be the use of two or more physically separate transmit antennas for signal transmission. Transmit diversity can be a type of antenna diversity, also known as space diversity, which two or more antennas can be used to improve the quality and reliability of a wireless link. Often, especially in urban and indoor environments, no clear line-of-sight (LOS) between transmitter and receiver may exist. Instead the signal may be reflected along multiple paths before finally being received. Each of bounce of the signal reflection can introduce phase shifts, time delays, attenuations, and/or distortions that can destructively interfere with one another at an aperture of the receiving antenna. Antenna diversity or transmit diversity can be effective at mitigating multipath interference.

The wireless device can apply PRB bundling to the ePDCCH RB and the PDSCH RB for transmit diversity when a PDSCH is transmitted with a rank of 1, 2, or 4. The wireless device can exclude the ePDCCH RB from PRB bundling for transmit diversity when a PDSCH is transmitted with a rank greater than 4 or an odd rank. At least two UERS ports may be needed for transmit diversity. When the ePDCCH RB is transmitted with a single UERS port, a UERS port used by the PDSCH may be borrowed for channel estimation and demodulation. If UERS base transmit (Tx) diversity is used for the ePDCCH transmission, and the node indicates to the wireless device to apply PRB bundling, and the PDSCH is transmitted by rank 1/2/4 with precoding vector [w1]/[w1, w2]/[w1, w2, w3, w4], respectively, the precoding matrix used for transmit diversity can be [w1 orth(w1)]/[w1, w2]/[w1, w2, w3, w4]. For example, when PDSCH is transmitted with rank 1 and precoding vector [w1], the ePDCCH can be transmitted with precoding matrix [w1 orth(w1)], where orth(w1) is a precoding vector that is orthogonal to w1. The precoding vector orthogonal to w1 can provide minimal interference from PDSCH. When PDSCH is transmitted with rank 2 and precoding vector [w1, w2], the ePDCCH can be transmitted with precoding matrix [w1, w2]. When PDSCH is transmitted with rank 4 and precoding vector [w1, w2, w3, w4], the ePDCCH can be transmitted with precoding matrix [w1, w2, w3, w4]. The precoding vector w1 can be a precoding vector for spatial multiplexing for a first antenna port in a set of antenna ports. The precoding vector w2 can be a precoding vector for spatial multiplexing for a second antenna port in the set of antenna ports. The precoding vector w3 can be a precoding vector for spatial multiplexing for a third antenna port in the set of antenna ports. The precoding vector w4 can be a precoding vector for spatial multiplexing for a fourth antenna port in the set of antenna ports. The precoding vectors w1, orth(w1), w2, w3, and w4 can each be an Nt×1 vector, where Nt indicates the number of node transmit antennas.

In another embodiment, an ePDCCH PRB bundling can be considered to improve the performance of ePDCCH channel estimation, where contiguous ePDCCH RBs are grouped together. However, in order to achieve frequency scheduling gain and diversity gain, limited ePDCCH RBs may be distributed (i.e., spaced apart in frequency) within a system bandwidth, and not grouped together. So, ePDCCH PRB bundling within multiple continuative (or contiguous) ePDCCH RBs may not be implemented, even with the ePDCCH having a high aggregation level. For a low aggregation level (e.g. AGL1), the ePDCCH PRB bundling may not be implemented since one DCI may be allocated in one RB for localized ePDCCH transmission.

To achieve channel estimation gain from PRB bundling for ePDCCH, the bundling process across the ePDCCH RB and the PDSCH RB can be applied instead of just PRB bundling between the ePDCCH RBs. In an example, PRB bundling across the ePDCCH RB and the PDSCH RB can be applied when a same precoding vector is used in the RBs. The ePDCCH RB and the PDSCH RB can be bundled for channel estimation and/or demodulation. The PRB bundling gain for ePDCCH RB and PDSCH RB bundling can be available even for a DCI with an aggregation level one (AGL1).

Figure 9:
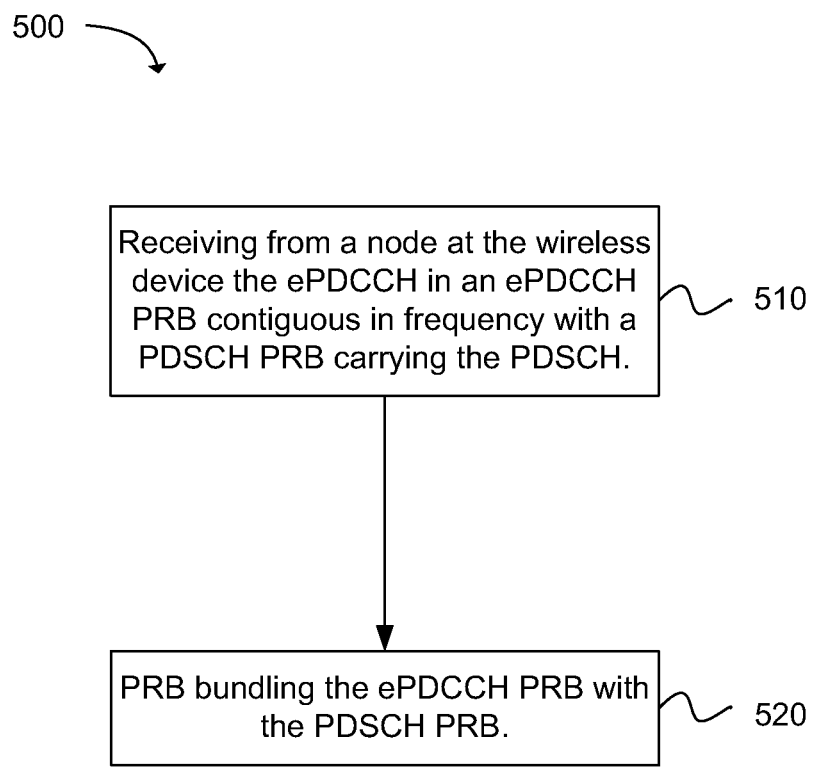
FIG. 9 depicts a flow chart of a method for physical resource block (PRB) bundling an enhanced physical downlink control channel (ePDCCH) with a physical downlink shared channel (PDSCH) at a wireless device in accordance with an example.

Another example provides a method 500 for physical resource block (PRB) bundling an enhanced physical downlink control channel (ePDCCH) with a physical downlink shared channel (PDSCH) at a wireless device, as shown in the flow chart in FIG. 9. The method may be executed as instructions on a machine, where the instructions are included on at least one computer readable medium. The method includes the operation of receiving from a node at the wireless device the ePDCCH in an ePDCCH PRB contiguous in frequency with a PDSCH PRB carrying the PDSCH, as in block 510. The operation of PRB bundling the ePDCCH PRB with the PDSCH PRB follows, as in block 520.

The method can further include the wireless device channel estimating or demodulating the PRB bundle using a PDSCH user equipment-specific reference signal (UERS) port and an ePDCCH UERS port. The PDSCH UERS port can differ from the ePDCCH UERS port. In another example, the method can further include the wireless device channel estimating or demodulating the PRB bundle using lowest rank user equipment-specific reference signal (UERS) port. The ePDCCH and the PDSCH can be transmitted with different ranks, and a rank of the ePDCCH or a rank of the PDSCH can be a lowest rank. In another configuration, the method can further include the wireless device channel estimating or demodulating the PRB bundle using a PDSCH user equipment-specific reference signal (UERS) port and an ePDCCH UERS port. The PDSCH UERS port and the ePDCCH UERS port use a same port and the PDSCH and the ePDCCH can be transmitted with a same rank. The ePDCCH can be a localized ePDCCH or a distributed ePDCCH.

The method can further include the wireless device receiving an indication from the node that the wireless device is to apply PRB bundling. The node can transmit the indication to the wireless device via radio resource control (RRC) signaling. The operation of receiving the ePDCCH and the PDSCH can further include receiving the ePDCCH from the node using transmit diversity when PDSCH is transmitted with rank 1, 2, or 4. The ePDCCH can be transmitted with precoding matrix [w1 orth(w1)] when PDSCH is transmitted with rank 1. The ePDCCH can be transmitted with precoding matrix [w1, w2] when PDSCH is transmitted with rank 2. The ePDCCH can be transmitted with precoding matrix [w1, w2, w3, w4] when PDSCH is transmitted with rank 4. The vector w1 can be a precoding vector for spatial multiplexing for a first antenna port in a set of antenna ports, w2 can be a precoding vector for spatial multiplexing for a second antenna port in the set of antenna ports, w3 can be a precoding vector for spatial multiplexing for a third antenna port in the set of antenna ports, and w4 can be a precoding vector for spatial multiplexing for a fourth antenna port in the set of antenna ports. The vector orth(w1) can be a precoding vector that is orthogonal to w1. The vectors w1, orth(w1), w2, w3, and w4 can each be an Nt×1 vector, where Nt indicates the number of node transmit antennas.

Figure 10:
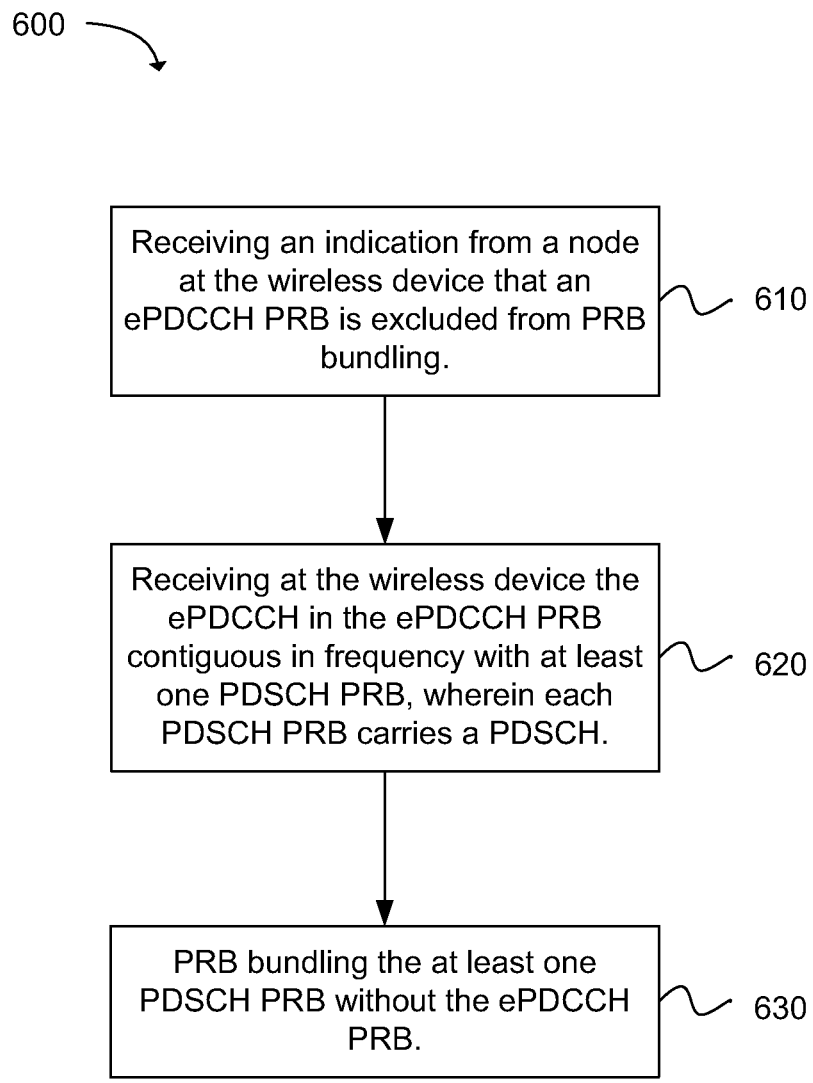
FIG. 10 depicts a flow chart of a method for excluding an enhanced physical downlink control channel (ePDCCH) in physical resource block (PRB) bundling at a wireless device in accordance with an example.

Another example provides a method 600 for excluding an enhanced physical downlink control channel (ePDCCH) in physical resource block (PRB) bundling at a wireless device, as shown in the flow chart in FIG. 10. The method may be executed as instructions on a machine, where the instructions are included on at least one computer readable medium or one non-transitory machine readable storage medium. The method includes the operation of receiving an indication from a node at the wireless device that an ePDCCH PRB is excluded from PRB bundling, as in block 610. The operation of receiving at the wireless device the ePDCCH in the ePDCCH PRB contiguous in frequency with at least one PDSCH PRB, wherein each PDSCH PRB carries a PDSCH follows, as in block 620. The next operation of the method can be PRB bundling the at least one PDSCH PRB without the ePDCCH PRB, as in block 630.

The indication can include an instruction to apply PRB bundling. The ePDCCH is a localized ePDCCH or a distributed ePDCCH. The method can further include the wireless device channel estimating or demodulating the PRB bundle using a PDSCH user equipment-specific reference signal (UERS) port.

The indication can exclude the ePDCCH PRB from PRB bundling when the PDSCH is transmitted with a rank greater than 4. In another example, the indication can exclude the ePDCCH PRB from PRB bundling when an ePDCCH precoder vector differs from a PDSCH precoder vector. In another configuration, the indication can include that multi-user multiple-input multiple-output (MU-MIMO) is applied, and the indication can exclude the ePDCCH PRB from PRB bundling when MU-MIMO is applied. In the examples, the node can transmit the indication to the wireless device via radio resource control (RRC) signaling. The method can further include the wireless device decoding the ePDCCH.

Figure 11:
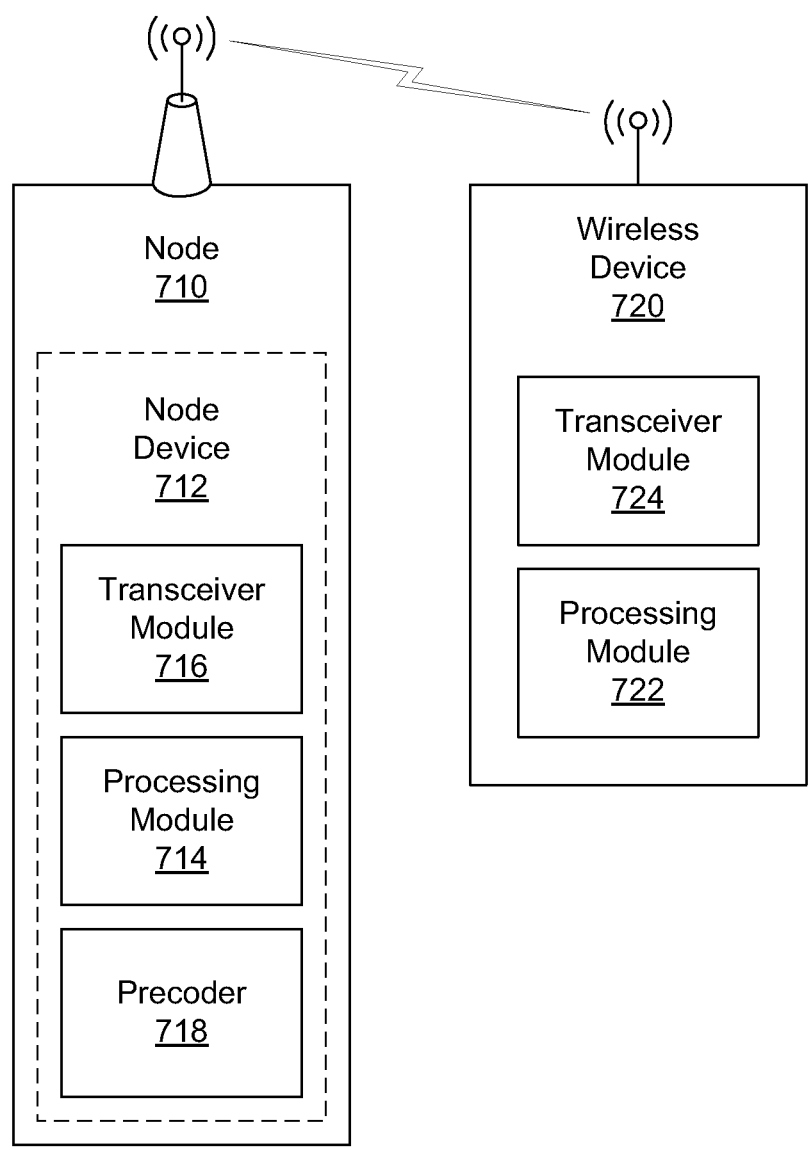
FIG. 11 illustrates a block diagram of a node and a wireless device in accordance with an example.

FIG. 11 illustrates an example node 710 and an example wireless device 720. The node can include a node device 712. The node device or the node can be configured to communicate with the wireless device. The node device can be configured to instruct a wireless device to apply physical resource block (PRB) bundling of an enhanced physical downlink control channel (ePDCCH) with a physical downlink shared channel (PDSCH). The node device can include a processing module 714, a transceiver module 716, and a precoder 718. The transceiver module can be configured to communicate with a wireless device and to transmit the ePDCCH in an ePDCCH PRB contiguous in frequency with a PDSCH PRB carrying the PDSCH and transmit an indication to PRB bundle the ePDCCH PRB with the PDSCH PRB.

The processing module 714 can be configured to generate the indication to PRB bundle the ePDCCH PRB with the PDSCH PRB when at least one of the following scenarios occurs: A PDSCH UERS port and an ePDCCH UERS port use a same port and the PDSCH and the ePDCCH is transmitted with a same rank; the PDSCH UERS port differs from the ePDCCH UERS port; the ePDCCH and PDSCH are transmitted with different rank; and the ePDCCH is transmitted from a node using transmit diversity and the PDSCH is transmitted with rank 1, 2, or 4. The precoder 718 can be configured to precode the ePDCCH for transmit diversity with rank 1, 2, or 4. The precoder can use a precoding matrix [w1 orth(w1)] when PDSCH is transmitted with rank 1, precoding matrix [w1, w2] when PDSCH is transmitted with rank 2, or precoding matrix [w1, w2, w3, w4] when PDSCH is transmitted with rank 4. The vector w1 can be a precoding vector for spatial multiplexing for a first antenna port in a set of antenna ports, w2 can be a precoding vector for spatial multiplexing for a second antenna port in the set of antenna ports, w3 can be a precoding vector for spatial multiplexing for a third antenna port in the set of antenna ports, and w4 can be a precoding vector for spatial multiplexing for a fourth antenna port in the set of antenna ports. The vector orth(w1) can be a precoding vector that is orthogonal to w1. The vectors w1, orth(w1), w2, w3, and w4 can each be an Nt×1 vector, where Nt indicates the number of node transmit antennas.

The processing module 714 can be further configured to de-boost a user equipment-specific reference signal (UERS) power in the ePDCCH PRB for multi-user multiple-input multiple-output (MU-MIMO) by a power offset $\delta_{power\text{-}offset}$ to maintain a substantially same energy per resource element (EPRE) between a UERS in the ePDCCH and a UERS in the PDSCH when the PDSCH and the ePDCCH is transmitted with a same rank.

In another example, the processing module 714 can be further configured to generate an indication to exclude an ePDCCH PRB from PRB bundling when at least one of the following scenarios occurs: The ePDCCH is PRB bundled with the PDSCH; the PDSCH is transmitted with a rank greater than 4; an ePDCCH precoder vector differs from a PDSCH precoder vector; and multi-user multiple-input multiple-output (MU-MIMO) is applied. The transceiver module 716 can be further configured to transmit the indication to exclude the ePDCCH from PRB bundling to the wireless device.

The node 710 can include a base station (BS), a Node B (NB), an evolved Node B (eNB), a baseband unit (BBU), a remote radio head (RRH), a remote radio equipment (RRE), or a remote radio unit (RRU).

The wireless device 720 can include a transceiver module 724 and a processing module 722. The wireless device can be configured for physical resource block (PRB) bundling of an enhanced physical downlink control channel (ePDCCH) with a physical downlink shared channel (PDSCH). The transceiver module can be configured to receive the ePDCCH in a first PRB contiguous in frequency with a second PRB carrying the PDSCH. The processing module can be configured to PRB bundle the first PRB with second PRB.

In an example, the processing module 722 can be further configured to channel estimate or demodulate the PRB bundle using a specified user equipment-specific reference signal (UERS) port when at least one of the following scenarios occurs: A PDSCH UERS port and an ePDCCH UERS port use a same port and the PDSCH and the ePDCCH is transmitted with a same rank; the PDSCH UERS port differs from the ePDCCH UERS port; the ePDCCH and the PDSCH are transmitted with different rank; and the ePDCCH is transmitted from a node using transmit diversity when PDSCH is transmitted with rank 1, 2, or 4. When the ePDCCH is transmitted using transmit diversity, the ePDCCH can be transmitted with precoding matrix [w1 orth(w1)] when PDSCH is transmitted with rank 1, precoding matrix [w1, w2] when PDSCH is transmitted with rank 2, or precoding matrix [w1, w2, w3, w4] when PDSCH is transmitted with rank 4. The vector w1 can be a precoding vector for spatial multiplexing for a first antenna port in a set of antenna ports, w2 can be a precoding vector for spatial multiplexing for a second antenna port in the set of antenna ports, w3 can be a precoding vector for spatial multiplexing for a third antenna port in the set of antenna ports, and w4 can be a precoding vector for spatial multiplexing for a fourth antenna port in the set of antenna ports. The vector orth(w1) can be a precoding vector that is orthogonal to w1. The vectors w1, orth(w1), w2, w3, and w4 can each be an Nt×1 vector, where Nt indicates the number of node transmit antennas.

In another example, the transceiver module 724 can be further configured to receive an indication from a node that the first PRB carrying the ePDCCH is excluded from PRB bundling when at least one of the following scenarios occurs: The ePDCCH is PRB bundled with the PDSCH; the PDSCH is transmitted with a rank greater than 4; an ePDCCH precoder vector differs from a PDSCH precoder vector; and multi-user multiple-input multiple-output (MU-MIMO) is applied.

Figure 12:
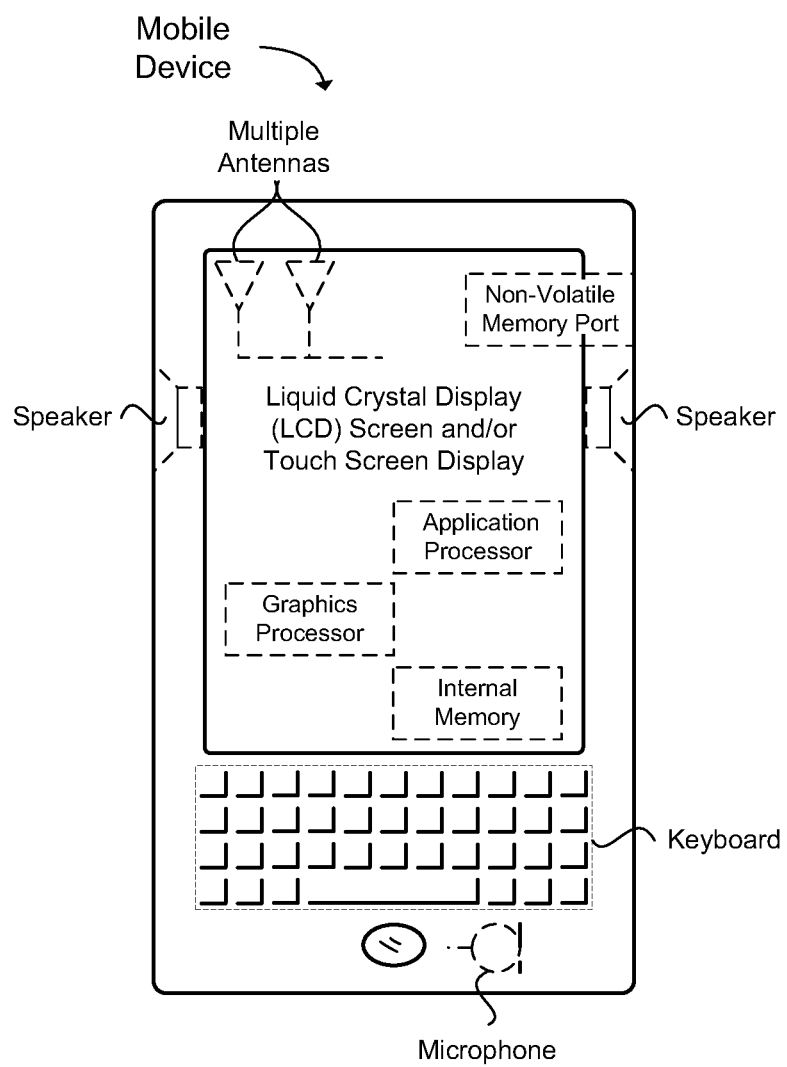
FIG. 12 illustrates a diagram of a wireless device in accordance with an example.

FIG. 12 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 12 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for physical resource block (PRB) bundling an enhanced physical downlink control channel (ePDCCH) with a physical downlink shared channel (PDSCH) at a wireless device, comprising:
   receiving from a node at the wireless device the ePDCCH in an ePDCCH PRB contiguous in frequency with a PDSCH PRB carrying the PDSCH;
   receiving an indication from the node that the wireless device is to apply PRB bundling, wherein the node transmits the indication to the wireless device via radio resource control (RRC) signaling, wherein the indication excludes the ePDCCH PRB from PRB bundling when an ePDCCH precoder vector differs from a PDSCH precoder vector; and
   PRB bundling the ePDCCH PRB with the PDSCH PRB.

2. The method of claim 1, further comprising:
   channel estimating or demodulating the PRB bundle using a PDSCH user equipment-specific reference signal (UERS) port and an ePDCCH UERS port, wherein the PDSCH UERS port differs from the ePDCCH UERS port and no single port is used as both a PDSCH UERS port and an ePDCCH UERS port.

3. The method of claim 1, further comprising:
   channel estimating or demodulating the PRB bundle using a lowest rank user equipment-specific reference signal (UERS) port, wherein the ePDCCH and the PDSCH are transmitted with different ranks, and a rank of the ePDCCH or a rank of the PDSCH is a lowest rank.

4. The method of claim 1, further comprising:
   channel estimating or demodulating the PRB bundle using a PDSCH user equipment-specific reference signal (UERS) port and an ePDCCH UERS port, wherein the PDSCH UERS port and the ePDCCH UERS port use a same port and the PDSCH and the ePDCCH is transmitted with a same rank.

5. The method of claim 1, wherein the ePDCCH is a localized ePDCCH or a distributed ePDCCH.

6. The method of claim 1, wherein receiving the ePDCCH and the PDSCH further comprises receiving the ePDCCH from the node using transmit diversity when PDSCH is transmitted with rank 1, 2, or 4, wherein the ePDCCH is transmitted with precoding matrix [w1 orth(w1)] when PDSCH is transmitted with rank 1, precoding matrix [w1, w2] when PDSCH is transmitted with rank 2, or precoding matrix [w1, w2, w3, w4] when PDSCH is transmitted with rank 4, where w1 is a precoding vector for spatial multiplexing for a first antenna port in a set of antenna ports, w2 is a precoding vector for spatial multiplexing for a second antenna port in the set of antenna ports, w3 is a precoding vector for spatial multiplexing for a third antenna port in the set of antenna ports, w4 is a precoding vector for spatial multiplexing for a fourth antenna port in the set of antenna ports, orth(w1) is a precoding vector that is orthogonal to w1; and w1, orth(w1), w2, w3, and w4 are each an $N_t \times 1$ vector, where $N_t$ indicates the number of node transmit antennas.

7. At least one non-transitory machine readable storage medium comprising a plurality of instructions adapted to be executed to implement the method of claim 1.

8. A wireless device configured for physical resource block (PRB) bundling of an enhanced physical downlink control channel (ePDCCH) with a physical downlink shared channel (PDSCH), comprising:
   a transceiver module configured to receive the ePDCCH in a first PRB contiguous in frequency with a second PRB carrying the PDSCH and to receive an indication from a node via radio resource control (RRC) that the wireless device is to apply PRB bundling, wherein the transceiver module is further configured to receive the indication from a node that the first PRB carrying the ePDCCH is excluded from PRB bundling when at least one of the following occurs:
   the ePDCCH is PRB bundled with the PDSCH;
   the PDSCH is transmitted with a rank greater than 4;
   an ePDCCH precoder vector differs from a PDSCH precoder vector; and
   multi-user multiple-input multiple-output (MU-MIMO) is applied; and
   a processing module configured to PRB bundle the first PRB with second PRB.

9. The wireless device of claim 8, wherein the processing module is further configured to channel estimate or demodulate the PRB bundle using a specified user equipment-specific reference signal (UERS) port when at least one of the following occurs:
   a PDSCH UERS port and an ePDCCH UERS port use a same port and the PDSCH and the ePDCCH is transmitted with a same rank;

the PDSCH UERS port differs from the ePDCCH UERS port;

the ePDCCH and the PDSCH are transmitted with different rank; and the ePDCCH is transmitted from a node using transmit diversity when PDSCH is transmitted with rank 1, 2, or 4, wherein the ePDCCH is transmitted with precoding matrix [w1 orth(w1)] when PDSCH is transmitted with rank 1, precoding matrix [w1, w2] when PDSCH is transmitted with rank 2, or precoding matrix [w1, w2, w3, w4] when PDSCH is transmitted with rank 4, where w1 is a precoding vector for spatial multiplexing for a first antenna port in a set of antenna ports, w2 is a precoding vector for spatial multiplexing for a second antenna port in the set of antenna ports, w3 is a precoding vector for spatial multiplexing for a third antenna port in the set of antenna ports, w4 is a precoding vector for spatial multiplexing for a fourth antenna port in the set of antenna ports, orth(w1) is a precoding vector that is orthogonal to w1; and w1, orth(w1), w2, w3, and w4 are each an $N_t \times 1$ vector, where $N_t$ indicates the number of node transmit antennas.

10. The wireless device of claim 8, wherein the wireless device is selected from the group consisting of a user equipment (UE) and a mobile station (MS), and the wireless device includes at least one of an antenna, a touch sensitive display screen, a speaker, a microphone, a graphics processor, an application processor, internal memory, a non-volatile memory port, and combinations thereof.

11. At least one non-transitory machine readable storage medium comprising a plurality of instructions adapted to be executed to implement a method for excluding an enhanced physical downlink control channel (ePDCCH) in physical resource block (PRB) bundling at a wireless device, comprising:

configuring the wireless device to apply PRB bundling of a plurality of PRBs including at least one PRB associated with an ePDCCH and a plurality of PDSCH PRBs wherein each PDSCH PRB carries a PDSCH;

receiving an indication via radio resource control (RRC) signaling from a node at the wireless device that the at least one ePDCCH PRB is excluded from the PRB bundling, wherein the indication excludes the at least one ePDCCH PRB from the PRB bundling when an ePDCCH precoder vector differs from a PDSCH precoder vector;

receiving at the wireless device the ePDCCH in the ePDCCH PRB contiguous in frequency with the plurality of PDSCH PRBS; and PRB bundling the plurality of PDSCH PRBs without the ePDCCH PRB.

12. The at least one non-transitory machine readable storage medium of claim 11, further comprising:

channel estimating or demodulating the PRB bundle using a PDSCH user equipment-specific reference signal (VERS) port.

13. The at least one non-transitory machine readable storage medium of claim 11, wherein the indication excludes the ePDCCH PRB from PRB bundling when the PDSCH is transmitted with a rank greater than 4.

14. The at least one non-transitory machine readable storage medium of claim 11, wherein the indication includes that multi-user multiple-input multiple-output (MU-MIMO) is applied, and the indication excludes the ePDCCH PRB from PRB bundling when MU-MIMO is applied.

15. The at least one non-transitory machine readable storage medium of claim 11, wherein the indication includes an instruction to apply PRB bundling.

16. The at least one non-transitory machine readable storage medium of claim 11, wherein the ePDCCH is a localized ePDCCH or a distributed ePDCCH.

17. The at least one non-transitory machine readable storage medium of claim 11, further comprising:

decoding the ePDCCH.

18. A node device of a node configured to instruct a wireless device to apply physical resource block (PRB) bundling of an enhanced physical downlink control channel (ePDCCH) with a physical downlink shared channel (PDSCH), comprising:

a transceiver module configured to communicate with a wireless device and to transmit the ePDCCH in an ePDCCH PRB contiguous in frequency with a PDSCH PRB carrying the PDSCH and transmit an indication via Radio Resource Control (RRC) signaling to PRB bundle the ePDCCH PRB with the PDSCH PRB, and a processing module configured to generate an indication to exclude an ePDCCH PRB from PRB bundling when at least one of the following occurs:

the ePDCCH is PRB bundled with the PDSCH;

the PDSCH is transmitted with a rank greater than 4;

an ePDCCH precoder vector differs from a PDSCH precoder vector; and multi-user multiple-input multiple-output (MU-MIMO) is applied; and the transceiver module is further configured to transmit the indication to exclude the ePDCCH from PRB bundling to the wireless device.

19. The node device of claim 18, further comprising:

the processing module configured to generate the indication to PRB bundle the ePDCCH PRB with the PDSCH PRB when at least one of the following occurs:

a PDSCH UERS port and an ePDCCH UERS port use a same port and the PDSCH and the ePDCCH is transmitted with a same rank;

the PDSCH UERS port differs from the ePDCCH UERS port;

the ePDCCH and PDSCH are transmitted with different rank; and the ePDCCH is transmitted from a node using transmit diversity and the PDSCH is transmitted with rank 1, 2, or 4.

20. The node device of claim 18, further comprising:

a precoder configured to precode the ePDCCH for transmit diversity with rank 1, 2, or 4, wherein the precoder uses a precoding matrix [w1 orth(w1)] when PDSCH is transmitted with rank 1, precoding matrix [w1, w2] when PDSCH is transmitted with rank 2, or precoding matrix [w1, w2, w3, w4] when PDSCH is transmitted with rank 4, where w1 is a precoding vector for spatial multiplexing for a first antenna port in a set of antenna ports, w2 is a precoding vector for spatial multiplexing for a second antenna port in the set of antenna ports, w3 is a precoding vector for spatial multiplexing for a third antenna port in the set of antenna ports, w4 is a precoding vector for spatial multiplexing for a fourth antenna port in the set of antenna ports, orth(w1) is a precoding vector that is orthogonal to w1; and w1, orth(w1), w2, w3, and w4 are each an $N_t \times 1$ vector, where $N_t$ indicates the number of node transmit antennas.

21. The node device of claim 18, further comprising:
the processing module configured to de-boost a user equipment-specific reference signal (UERS) power in the ePDCCH PRB for multi-user multiple-input multiple-output (MU-MIMO) by a power offset $\delta_{power\text{-}offset}$ to maintain a substantially same energy per resource element (EPRE) between a UERS in the ePDCCH and a UERS in the PDSCH when the PDSCH and the ePDCCH is transmitted with a same rank.

22. The node device of claim 18, wherein the node is selected from the group consisting of a base station (BS), a Node B (NB), an evolved Node B (eNB), a baseband unit (BBU), a remote radio head (RRH), a remote radio equipment (RRE), a remote radio unit (RRU), and combinations thereof.

* * * * *